United States Patent [19]
Inubushi et al.

[11] Patent Number: 6,148,075
[45] Date of Patent: Nov. 14, 2000

[54] ILLUMINATED BUTTON BACKLIGHTED BY WHITE LIGHT

[75] Inventors: Toshiya Inubushi; Koji Saito; Tsutomu Inoue, all of Tokyo, Japan

[73] Assignee: Mitsubishi Denki Kabushiki Kaisha, Tokyo, Japan

[21] Appl. No.: 09/112,019

[22] Filed: Jul. 8, 1998

[30] Foreign Application Priority Data

Aug. 27, 1997 [JP] Japan ................................. 9-230720

[51] Int. Cl.⁷ .................................................. H04M 1/00
[52] U.S. Cl. ........................................... 379/368; 379/433
[58] Field of Search ................................ 379/433, 428, 379/368–370; 200/314; 455/90, 575

[56] References Cited

U.S. PATENT DOCUMENTS 5,573,107  11/1996  Nakano et al. .
5,797,482   8/1998  LaPointe et al. ................ 200/314

FOREIGN PATENT DOCUMENTS 0763838   3/1997   European Pat. Off. .
1176399  12/1989   Japan .
3280392  12/1991   Japan .
8007614   1/1996   Japan .

Primary Examiner—Jack Chiang
Attorney, Agent, or Firm—Rothwell, Figg, Ernst & Manbeck

[57] ABSTRACT

An illuminated button including a key button and an electroluminescent light (EL) for illuminating the key button from its bottom. The key button is composed of a silicone rubber material mixed with white color particles which prevent, while the EL is inoperative, a pink light reflected from the EL from being projected to the outside through the key button. This makes possible to solve a problem of a conventional illuminated button, which includes a key button and a white light EL used as a backlight, in that the pink color of the EL is seen from the outside through the key button, and this spoils the beauty of the illuminated button.

20 Claims, 5 Drawing Sheets

+L : WHITE
+b : YELLOW
-a : GREEN
+a : RED
-b : BLUE
-L : BLACK

FIG.11B

|   | EL ALONE | DIFFUSION PLATE | SILICONE RUBBER |
|---|---|---|---|
| a | 27.27 | -0.70 | -1.97 |
| b | 19.90 | -5.31 | -5.12 |
| L | 82.98 | 71.36 | 62.13 |

FIG.11C

|   | EL & DIFFUSION PLATE | EL & SILICONE RUBBER | EL & DIFFUSION PLATE & SILICONE RUBBER |
|---|---|---|---|
| a | 11.49 | 9.84 | 3.75 |
| b | 6.88 | 5.60 | 2.25 |
| L | 85.19 | 77.14 | 77.03 |
| α | REDUCED BY 57.9 % | REDUCED BY 63.9 % | REDUCED BY 86.2 % |

RATIO OF CHANGE ($\alpha$)
= (SUPERIMPOSED EL − EL ALONE) × 100 % / EL ALONE

ILLUMINATED BUTTON BACKLIGHTED BY WHITE LIGHT

BACKGROUND OF THE INVENTION

1. Field of the Invention

The present invention relates to a keypad used for electronic equipment such as mobile telephones, and more particularly to an illuminated button with its key button illuminated from its bottom by a light source.

2. Description of Related Art

Mobile telephones are rapidly spreading thanks to the remarkable progress in technology, and expected to further spread because of their convenience capable of anytime, anywhere communications. To achieve the anytime, anywhere communications, they employ an illuminated button pad to enable users to operate even in the night or in dark places.

Figure 12:
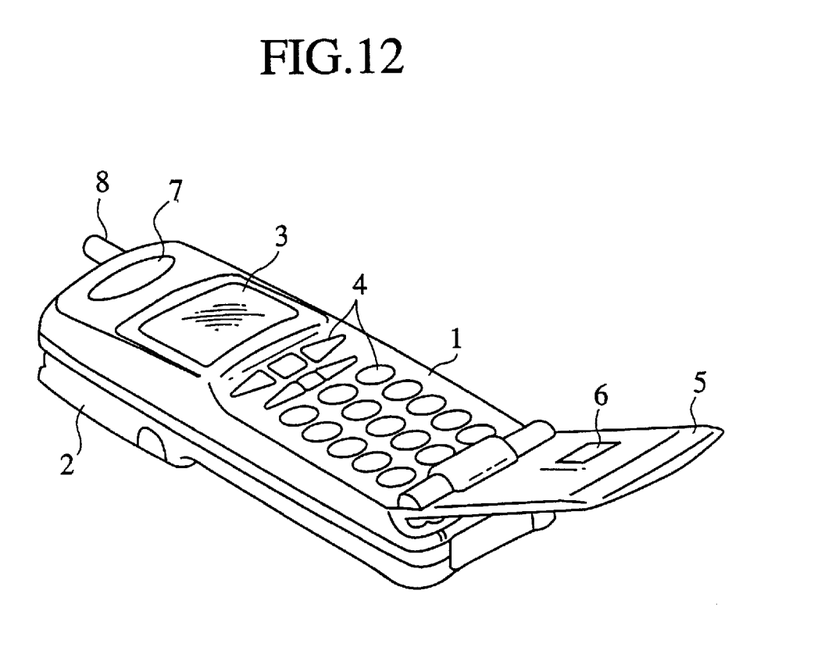
FIG. 12 is a perspective view showing a mobile telephone to which an illuminated button array is applied.

FIG. 12 is a perspective view showing an appearance of a mobile telephone of such a type. In FIG. 12, the reference numeral 1 designates a front case and 2 designates a rear case. They constitute a case for enclosing electronic components like a printed circuit board equipped with ICs or LSIs. The reference numeral 3 designates a liquid crystal display (LCD) mounted on the front case 1; and 4 designates a keypad including dialing keypad and function keys arrayed on the front case 1, which are backlighted by a light source not shown in this figure, for convenience of users operating in dark places. The reference numeral 5 designates a flip rotatably mounted on an edge of the front case 1 to cover and protect the keypad and to prevent erroneous operation while it is closed, although its open state is not shown in this figure. The reference numeral 6 designates a microphone mounted on the flip 5, 7 designates a speaker and 8 designates a transmitting and receiving antenna.

With such an arrangement, the mobile telephone includes in the case a light source for backlighting the keypad 4, which consists of an electroluminescent light (simply called EL from now on). The EL comprises, on a base film, a transparent electrode layer, a luminescent layer, a dielectric layer, a back electrode layer, and an insulating layer, which are stacked in this order, and emits light when supplied with an AC voltage between the transparent electrode layer and back electrode layer to induce electric field excitation for causing electrons to collide with the luminescent layer. Common ELs emit light of a blue-green family.

Thus, in the conventional illuminated keypad, the key buttons are backlighted from their bottom, and are usually provided with numerals, characters or symbols printed on their tops in various colors such as black, red and blue. Accordingly, these prints become clear or opaque, or change their original colors depending on the backlight because the EL emits in the color of the blue-green family, which is unsuitable for some printed colors. This will lead to use white light to backlight the key buttons to improve the visibility of the printed characters.

It will be possible to change the original color of the blue-green family inherent in the EL into white light by mixing red ink, which is a complementary color of the blue green, into the material of the luminescent layer, and by stacking the layer to form the EL as described above. Thus, the backlight becomes white owing to the effect of the red ink.

The white light used to backlight the key buttons will clearly show the numerals, characters and symbols printed on them independently of the printed colors.

The EL thus emitting the white light, however, appears to be pink from the outside through the key button while the EL is inoperative because the red ink is mixed and the key button is composed of light transmission material, thereby spoiling its beauty.

In short, the conventional illuminated key pad is undesirable in terms of the beauty, and provides users with a sense of incongruity at switching the EL between its operative mode and inoperative mode because it appears to be white while it is emitting light in the operative mode, but to be pink while it is in the inoperative mode.

SUMMARY OF THE INVENTION

The present invention is implemented to solve the foregoing problem. It is therefore an object of the present invention to provide an illuminated button that can eliminate the sense of incongruity without impairing its beauty.

According to a first aspect of the present invention, there is provide an illuminated button comprising: a key button composed of a light transmission material; an electroluminescent light, disposed on a bottom side of the key button, for illuminating, while the electroluminescent light is operative, the key button from its bottom; switch contacts for producing a key operation signal when the key button is depressed; and means for attenuating reflected light from the electroluminescent light while it is inoperative.

Here, the means for attenuating may be composed of a material with a light transmission repression property.

The means for attenuating may be composed of a material with a light scattering property.

The means for attenuating may comprise color particles mixed into the light transmission material constituting the key button.

The color of the color particles may belong to the same color family as that of light emitted from the electroluminescent light to backlight the key button.

Both the color particles and the light that backlights the key button may be white.

The means for attenuating may comprise a light transmission color print formed on the bottom of the key button.

The color of the light transmission color print may belong to the same color family as that of light emitted from the electroluminescent light to backlight the key button.

Both the light transmission color print and the light that backlights the key button may be white.

The means for attenuating may comprise a matte surface formed on top of the key button.

The means for attenuating may comprise a semi-transparent reflection sheet disposed between the key button and the electroluminescent light.

The semi-transparent sheet may be disposed on a surface of the electroluminescent light.

The means for attenuating may comprise a semi-transparent reflection material printed on a surface of the electroluminescent light.

The means for attenuating may comprises a light scattering prism sheet disposed between the key button and the electroluminescent light.

The means for attenuating may comprise a base film constituting the electroluminescent light, and the base film may have undergone a light transmission repression processing.

The light transmission repression processing may a matte processing applied to a surface of the base film.

The light transmission repression processing may be a processing to form a plurality of microscopic triangular asperities on the surface of the base film.

The base film may consist of a semi-transparent sheet.

The key button may comprise a letter print formed on its top.

According to a second aspect of the present invention, there is provided an illuminated button pad including a plurality of illuminated buttons, each illuminated button comprising: a key button composed of a light transmission material; an electroluminescent light, disposed on a bottom side of the key button, for illuminating, while the electroluminescent light is operative, the key button from its bottom; switch contacts for producing a key operation signal when the key button is depressed; and means for attenuating reflected light from the electroluminescent light while it is inoperative.

BRIEF DESCRIPTION OF THE DRAWINGS

FIGS. 11A–11C are diagrams showing measured results estimating the effect of the present invention, wherein

DETAILED DESCRIPTION OF THE PREFERRED EMBODIMENTS

The invention will now be described with reference to the accompanying drawings.
Embodiment 1

Figure 1:
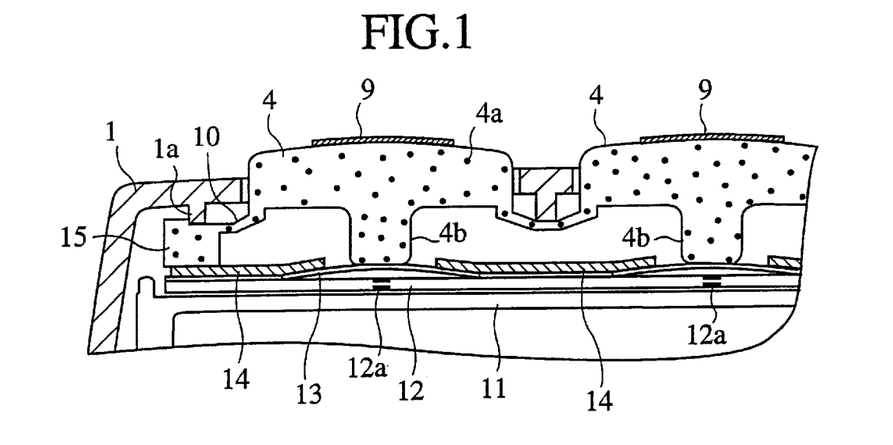
FIG. 1 is an enlarged cross-sectional view of an embodiment 1 of an illuminated button in accordance with the present invention.

FIG. 1 is an enlarged cross-sectional view showing an embodiment 1 of an illuminated button in accordance with the present invention. In FIG. 1, the reference numeral 1 designates a front case. Each reference numeral 4 designates a key button that is disposed on the front case 1, and composed of a silicone rubber material into which color particles 4a of white pigment are mixed. Each reference numeral 4b designates an actuator protruding from the bottom of the key button 4; 9 designates printing such as numerals, letters and symbols printed on top of each key button 4; 10 designates a thinned portion that links the key buttons 4 and supports them depressibly; the reference numeral 11 designates a shielded case composed of a resin, on which a switch electrode sheet 12 is attached, on which switch contacts 12a and switch patterns are formed; and 13 designates a click plate that is formed on the switch electrode sheet 12 and has convexes formed at positions opposite to the actuators 4b. The reference numeral 14 designates an EL disposed on the click plate 13 with its luminescent layer mixed with red ink to emit white light; and 15 designates an edge of both the key button 4 and thinned portion 10. The edge 15, EL 14, click plate 13 and switch electrode sheet 12 are supported between a protrusion 1a of the front case 1 and the shielded case 11.

Next, the operation of the present embodiment 1 will be described.

When one of the key buttons 4 is depressed, its actuator 4b presses the convex of the click plate 13 to alter its shape. By further depressing the key button 4, the convex of the click plate 13 comes to press the switch electrode sheet 12. Thus, switch contacts 12a on the switch electrode sheet 12 close, thereby generating a key operation signal associated with the depressed key button 4.

When the key buttons 4 are operated in the night or in a dark place, the EL 14 is supplied with an AC voltage from a power supply not shown in this figure and emits white light so that the key buttons 4 are backlighted from their bottom with the white light. Although the key buttons 4 are mixed with the white color particles 4a, they maintain sufficient transparency to allow the white light to pass through them, and besides, the intensity of the light emitted by the EL 14 is high. This enables the user to carry out the key operation with visibility of the letter prints 9 on the illuminated key buttons 4.

In contrast with this, when the key buttons 4 are operated in a light place during the daytime, the EL 14 is not activated, and kept pink without emitting light. However, since the key buttons 4 are mixed with the white color particles 4a, almost all the pink light produced by the reflection from the EL 14 is blocked, and hence the EL 14 appears to be white, the color of the key buttons 4, when seen from the tops of the key buttons 4.

This process will be described in more detail. First, external light is incident onto the EL 14 through the key buttons 4 with its intensity being reduced owing to the color particles 4a. The incident light passing through the key buttons 4 illuminates the EL 14, and is partly reflected from them. Thus, the reflected light illuminates the bottom of the key buttons 4, and is projected to the outside through the key buttons 4 with its intensity being reduced again by the color particles 4a. Since the original incident light is rather low in its intensity, and undergoes the twofold block of the color particles 4a, the reflected light from the EL 14 almost disappears, and the white color of the color particles 4a appears from the tops of the key buttons 4.

According to the present embodiment 1, since the color particles 4a are white, which is the same color as the color of the light emitted by the EL 14, the key buttons 4 are kept white independently of whether the EL 14 is operative or not. This can prevent the user from having the sense of incongruity, without impairing the beautiful appearance of the key buttons 4.

Embodiment 2

Figure 2:
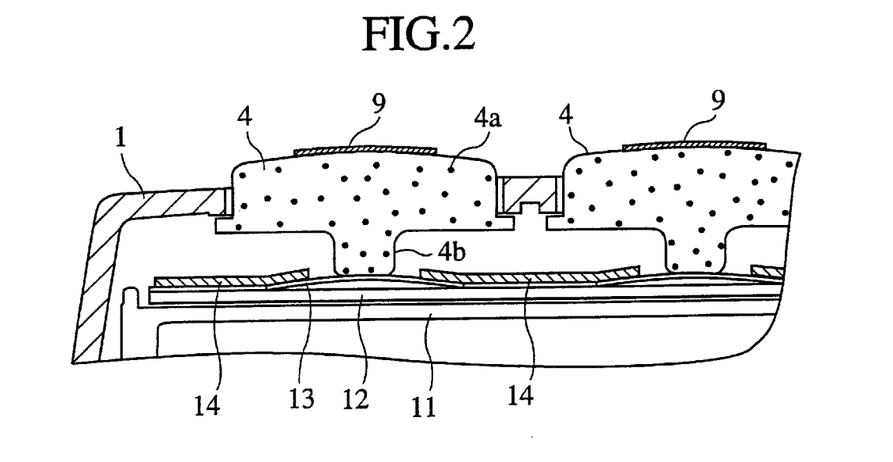
FIG. 2 is an enlarged cross-sectional view of an embodiment 2 of the illuminated button in accordance with the present invention.

FIG. 2 is an enlarged cross-sectional view showing an embodiment 2 of the illuminated button in accordance with the present invention. In FIG. 2, each reference numeral 4 designates a key button composed of a molded resin material with white color particles 4a mixed.

The present embodiment 2 differs from the foregoing embodiment 1 in that the key buttons 4 are composed of the molded resin material instead of the silicone rubber. In the present embodiment 2, the color particles 4a block the pink light from the EL 14 in the inoperative state as in the embodiment 1, so that the key buttons 4 appear to be white close to the white color particles 4a when seen from their tops.

Embodiment 3

Figure 3:
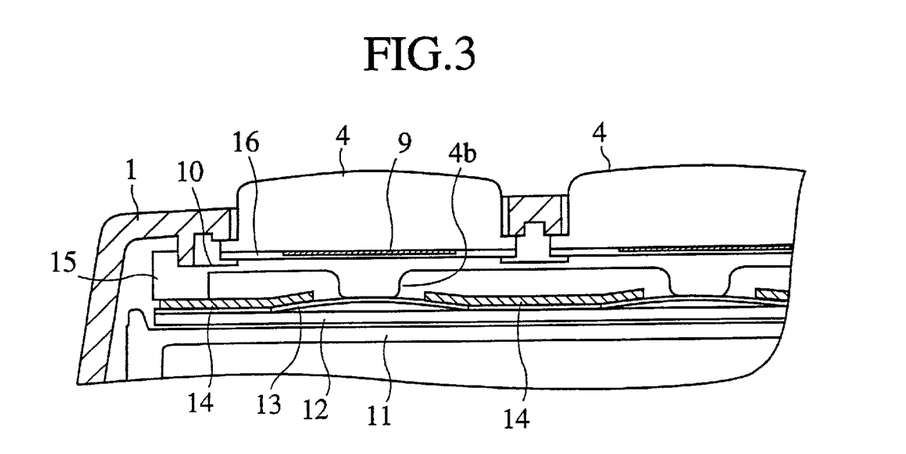
FIG. 3 is an enlarged cross-sectional view of an embodiment 3 of the illuminated button in accordance with the present invention.

FIG. 3 is an enlarged cross-sectional view showing an embodiment 3 of the illuminated button in accordance with the present invention. In FIG. 3, each reference numeral 4 designates a key button made of a molded light transmission resin material; 9 designates a letter print formed on the bottom of each key button 4; and 16 designates light transmission ink which is composed of white pigment, and printed on the letter print over the entire area of the bottom of each key button 4. The light transmission ink 16 is white in correspondence with the light emitted from the EL 14. Each reference numeral 4b designates an actuator consisting of a rubber material integrally adhering to the light transmission ink 16 on the bottoms of the key buttons 4; and 10 designates a thinned portion.

Thus, the light emitted from the EL 14 in action backlights the bottoms of the key buttons 4 through the transparent rubber material of the actuators 4b and light transmission ink 16, and is projected to the outside from the tops of the key buttons 4. This enables the user to clearly identify the letter prints 9 on the bottoms of the key buttons 4. In addition, since the intensity of the light emitted from the EL 14 is sufficiently high, enough projection is obtained through the EL 14 in spite of the partial block by the light transmission ink 16. Thus, the user can identify the letter prints 9 even in a dark place.

In contrast with this, in the inoperative state of the EL 14, the pink light reflected from the EL 14 is partially blocked by the light transmission ink 16, so that the tops of the key buttons 4 appear to be white, which is the color of the light transmission ink 16, and hence the letter prints 9 can be identified clearly. More specifically, the reflected light from the EL 14, which is produced by the external light that is incident onto the EL 14 through the key buttons 4, light transmission ink 16 and rubber material, and then reflected from the EL 14, undergoes twofold attenuation through the light transmission ink 16 in the course of the incidence and reflection. In addition, since the intensity of the original external light is low, the reflected light from the EL 14 is little projected to the outside.

According to the present embodiment 3, since the light transmission ink 16 is white, which is the same color as the emitted light by the EL 14, the key buttons 4 are kept white independently of whether the EL 14 is in action or not. This can prevent the user from having the sense of incongruity, without impairing the beautiful appearance of the key buttons 4.

Although the light transmission ink 16 is printed on the bottom of each key button 4 in the present embodiment 3, a similar advantage can be achieved by printing it on top of each key button 4.

Embodiment 4

Figure 4:
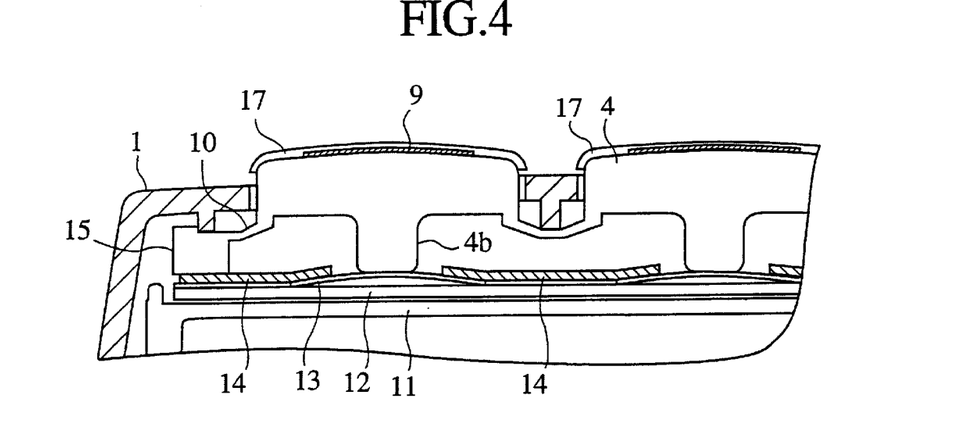
FIG. 4 is an enlarged cross-sectional view of an embodiment 4 of the illuminated button in accordance with the present invention.

FIG. 4 is an enlarged cross-sectional view of an embodiment 4 of the illuminated button in accordance with the present invention. In FIG. 4, each reference numeral 17 designates a matte coating applied on the letter print 9 over the entire area of the top of each key button 4.

The present embodiment 4 prevents, with the matte coatings 17, the external light incident onto the EL 14 through the key buttons 4 and reflected off the EL 14, from being projected to the outside as the pink light.

Thus, the present embodiment 4 can also prevent the user from having the sense of incongruity, without spoiling the beautiful appearance of the key buttons 4. In addition, although the letter prints 9 could be peeled off or worn out by manipulation because they are printed on the tops of the key buttons 4, their resistance to wear can be improved by the matte coating 17.

Embodiment 5

Figure 5:
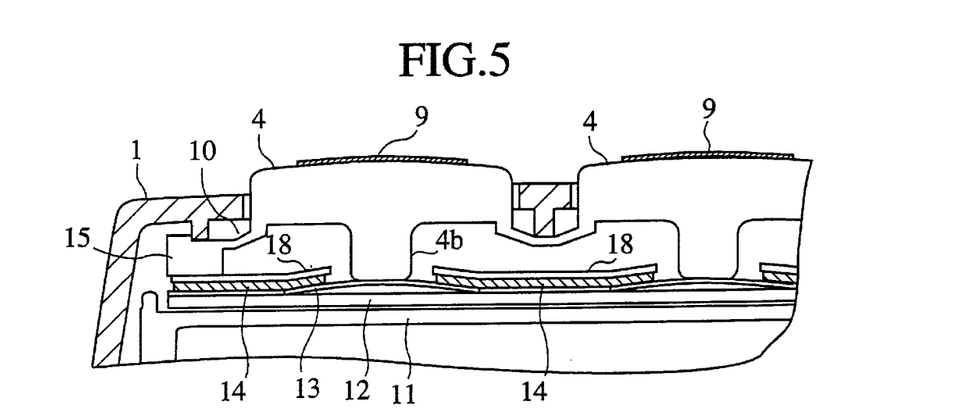
FIG. 5 is an enlarged cross-sectional view of an embodiment 5 of the illuminated button in accordance with present invention.

FIG. 5 is an enlarged cross-sectional view showing an embodiment 5 of the illuminated button in accordance with the present invention. In FIG. 5, the reference numeral 18 designates a semi-transparent reflection sheet laminated on a surface of the EL 14. The sheet 18 is printed with ink containing iriodin (mica) pearl manufactured by Merck Japan Company, the compounding ratio of which is controlled to adjust its transparency to a predetermined value.

The present embodiment 5 prevents, with the semi-transparent reflection sheet 18, the external light incident onto the EL 14 through the key buttons 4, from being reflected off the EL 14 and projected to the outside as the pink light. More specifically, the light projected to the outside through the key buttons 4 has two components: the reflection of the external light from the semi-transparent reflection sheet 18; and the pink light reflected from the EL 14 and passing through the semi-transparent reflection sheet 18. In this case, since the intensity of the former is much higher than that of the latter, the pink light can be effectively blocked.

Thus, the present embodiment 5 can also prevent the user from having the sense of incongruity, without impairing the beautiful appearance of the key buttons 4.

Embodiment 6

Figure 6:
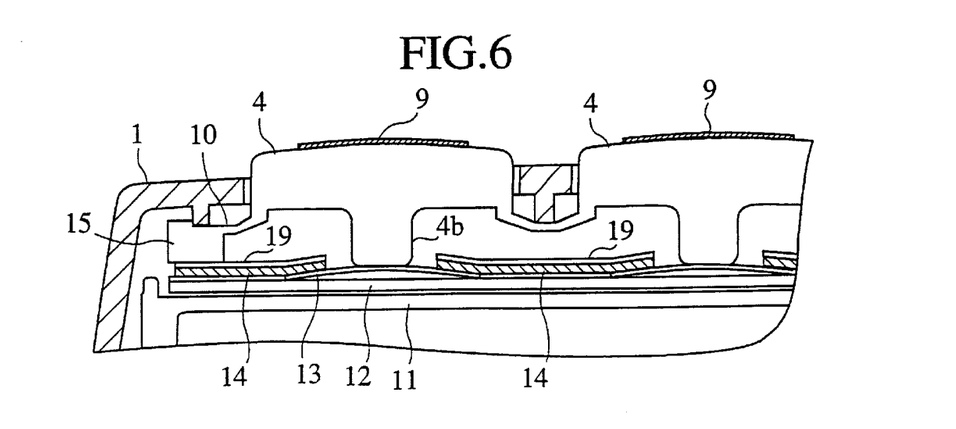
FIG. 6 is an enlarged cross-sectional view of an embodiment 6 of the illuminated button in accordance with the present invention.

FIG. 6 is an enlarged cross-sectional view showing an embodiment 6 of the illuminated button in accordance with the present invention. In FIG. 6, the reference numerals 19 designate a semi-transparent reflection print formed on a surface of the EL 14 by printing ink containing mica, or the like.

The present embodiment 6 prevents, with the semi-transparent reflection prints 19, the external light incident onto the EL 14 through the key buttons 4, from being reflected off the EL 14 and projected to the outside as the pink light. The pink light can be effectively blocked as in the foregoing embodiment 5.

Thus, the present embodiment 6 can also prevent the user from having the sense of incongruity, without impairing the beautiful appearance of the key buttons 4.

Embodiment 7

Figure 7:
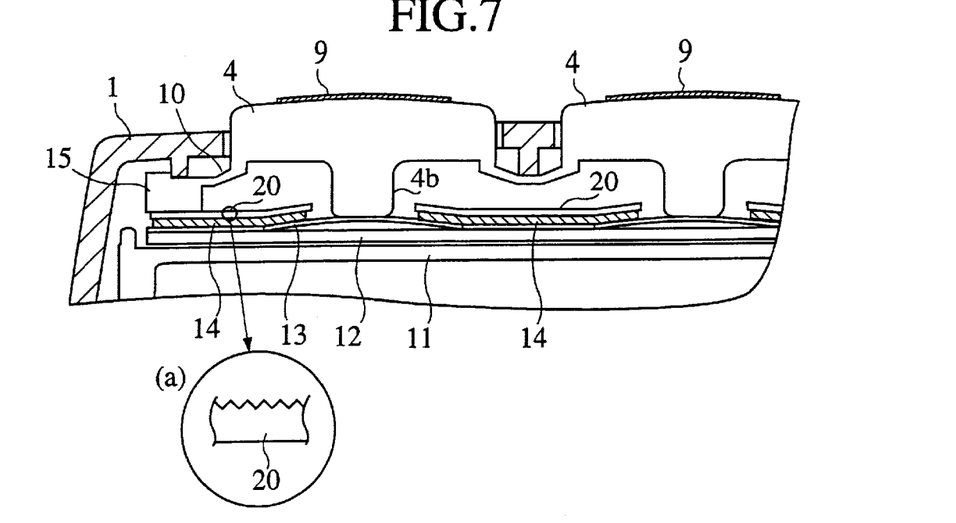
FIG. 7 is an enlarged cross-sectional view of an embodiment 7 of the illuminated button in accordance with the present invention.

FIG. 7 is an enlarged cross-sectional view showing an embodiment 7 of the illuminated button in accordance with the present invention. In FIG. 7, the reference numeral 20 designates a prism sheet formed on a surface of the EL 14. It has on its surface microscopic triangular asperities of several tens of micrometers high, whose part is shown in an enlarged inlet.

The present embodiment 7 prevents the external light incident onto the EL 14 through the key buttons 4 from being reflected off the EL 14 and projected to the outside as the pink light by scattering it by the prism sheet 20.

Thus, the present embodiment 7 can also prevent the user from having the sense of incongruity, without impairing the beautiful appearance of the key buttons 4.

Embodiment 8

Figure 8:
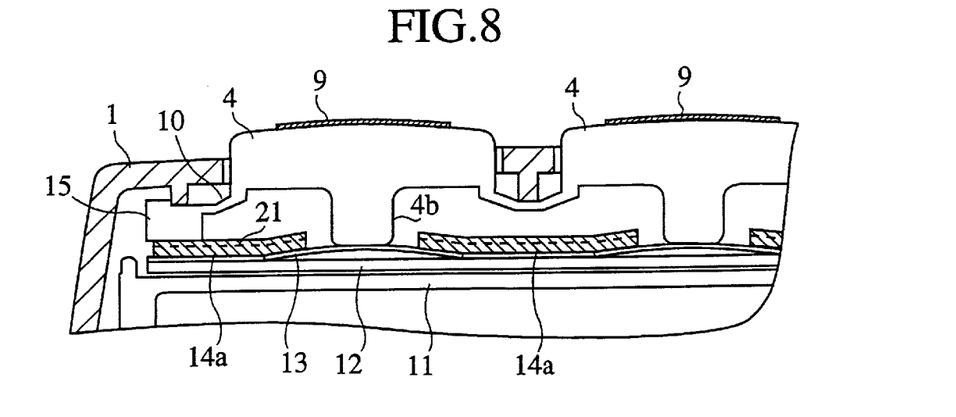
FIG. 8 is an enlarged cross-sectional view of an embodiment 8 of the illuminated button in accordance with the present invention.

FIG. 8 is an enlarged cross-sectional view showing an embodiment 8 of the illuminated button in accordance with the present invention. In FIG. 8, the reference numeral 14a designates an EL that differs from the EL 14 of the foregoing embodiments in that it has a matte finished base film 21.

Thus, the present embodiment 8 prevents, with the matte finished base film 21 of the EL 14a, the pink light from being reflected off the EL 14 and projected to the outside.

Accordingly, the present embodiment 8 can also prevent the user from having the sense of incongruity, without impairing the beautiful appearance of the key buttons 4. In addition, since the matte finished base film 21 of the EL itself blocks the reflected light, any other material is required, resulting in a compact structure.

Although the present embodiment 8 applies the matte finishing to the base film of the EL 14a, the microscopic triangular asperities can be formed on the base film as in the foregoing embodiment 7. Alternatively, the base film can be composed of a semi-transparent reflection material as in the embodiment 5.

Embodiment 9

Figure 9:
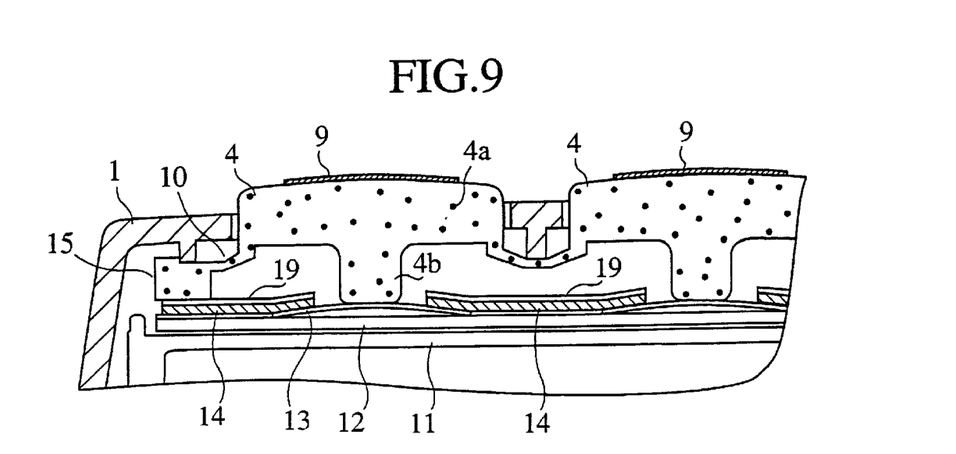
FIG. 9 is an enlarged cross-sectional view of an embodiment 9 of the illuminated button in accordance with the present invention.

FIG. 9 is an enlarged cross-sectional view showing an embodiment 9 of the illuminated button in accordance with the present invention. In FIG. 9, the reference numeral 4a designates white color particles composed of a silicone rubber material and mixed into the key buttons 4, and the reference numeral 19 designates a semi-transparent reflection print formed on a surface of the EL 14 by printing ink containing mica, or the like.

The present embodiment 9 prevents the external light incident onto the EL 14 through the key buttons 4 from being reflected off the EL 14 and projected to the outside as the pink light, by using a combination of the color particles 4a of the foregoing embodiment 1 and the semi-transparent reflection print 19 of the embodiment 6. The pink reflected light can be effectively blocked owing to a synergistic effect of the two.

Embodiment 10

Figure 10:
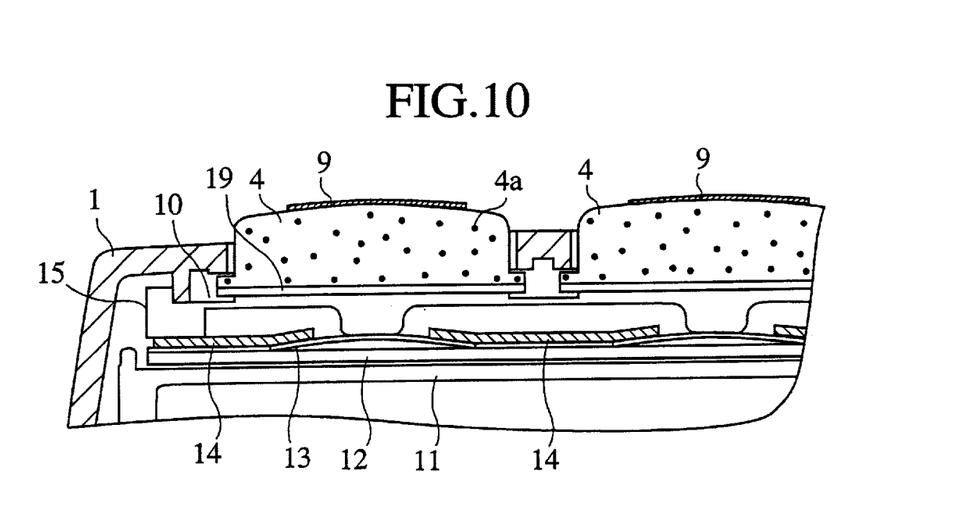
FIG. 10 is an enlarged cross-sectional view of an embodiment 10 of the illuminated button in accordance with the present invention.

FIG. 10 is an enlarged cross-sectional view showing an embodiment 10 of the illuminated button in accordance with the present invention. In FIG. 10, the reference numeral 4a designates white color particles mixed into the key button 4 composed of a molded resin, and the reference numeral 19 designates a semi-transparent reflection print formed on the bottom surface of the key button 4.

The present embodiment 10 prevents the external light incident onto the EL 14 through the key buttons 4 and reflected off the EL 14 from being projected to the outside as the pink light, by using a combination of the color particles 4a of the foregoing embodiment 2 and the semi-transparent reflection prints 19 of the embodiment 6. The pink reflected light can be effectively blocked owing to a synergistic effect of the two.

Although the foregoing embodiments are described taking the white light as an example of the backlight illuminating the bottom of the key buttons 4 from the EL 14, backlight of other colors can be applied depending on the color of letters printed on the key buttons 4. In this case, similar effect can be expected by preventing the surface color of the EL 14 from being projected to the outside by the means of the foregoing embodiments.

Figure 11A:
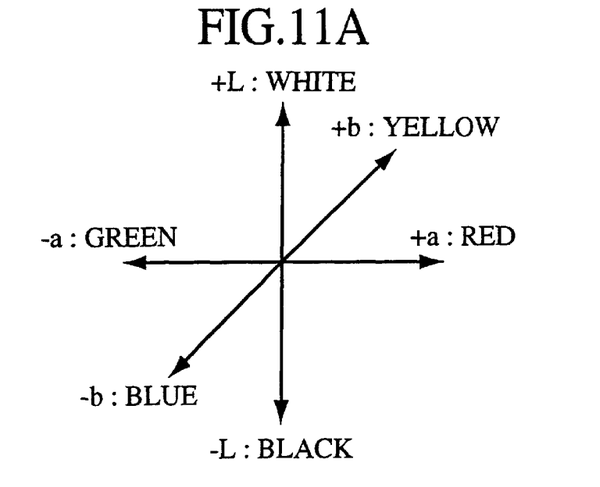
FIG. 11A is a graph showing relationships of color components.
Figure 11B:
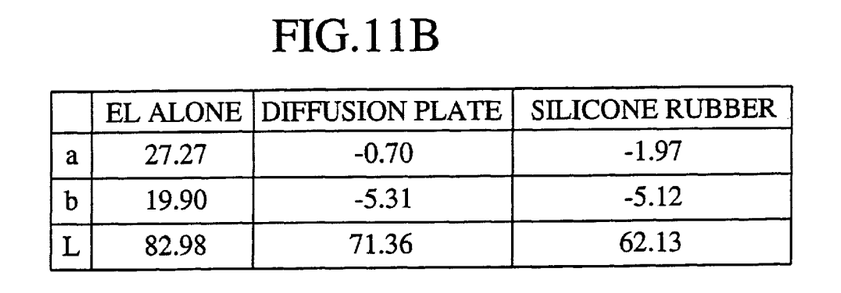
FIG. 11B is a table showing measured data of the color components.
Figure 11C:
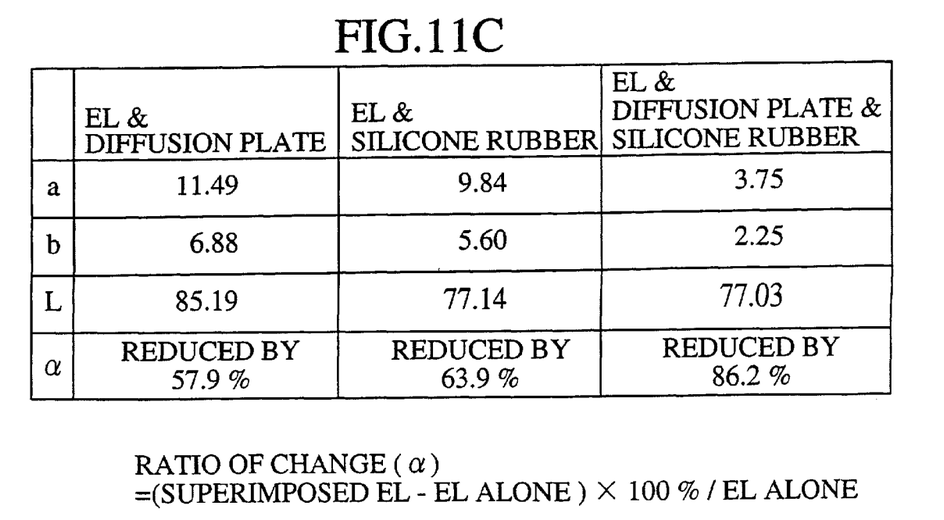
FIG. 11C is a table showing the measured data estimating the effect of the present invention.

FIGS. 11A–11C are diagrams showing experimental results estimating the effect of the present invention. FIG. 11A illustrates color component relationships on a coordinate system, in which the a axis represents red-green coordinates, the L axis represents black-white coordinates, and the b axis represents yellow-blue coordinates. The red component increases in the +a direction, and the green component increases toward the −a direction. The white component increases in the +L direction, and the black component increases toward the −L direction. Likewise, the yellow component increases in the +b direction, and the blue component increases toward the −b direction.

In the experimental examples, the color components are measured on respective surfaces of a single EL emitting white light, of a matte finished diffusion plate, and of a 2-mm thick silicone rubber plate into which white color particles are mixed.

With regard to the single EL, the red component is 27.27, the yellow component is 19.90 and the white component is 82.98 because of the white light emitting EL.

With regard to the diffusion plate, the red component is −0.70, the yellow component is −5.31 and the white component is 71.36, indicating that the green and blue components are greater than the red and yellow components.

With regard to the silicone rubber plate, the red component is −1.97, the yellow component is −5.12 and the white component is 62.13, indicating that the green and blue components are greater than the red and yellow components.

Next, FIG. 11C shows the measured data estimating the effects of the present invention.

First, the measured results of the EL combined with the diffusion plate superimposed thereon are a=11.49, b=6.88, and L=85.19. Thus, the changing ratio $\alpha$ compared with the red component a of the single EL is reduce by 57.9%, where the changing ratio is given by (superimposed EL−single EL)×100%/single EL.

The measured results of the EL combined with the silicone rubber plate superimposed thereon are a=9.84, b=5.60, and L=77.14. Thus, the changing ratio $\alpha$ is reduced by 63.9%.

The measured results of the EL combined with the diffusion plate and silicone rubber plate superimposed thereon are a=3.75, b=2.25, and L=77.03. Thus, the changing ratio $\alpha$ is reduced by 86.2%. The entire experimental results indicate improvement.

As described above, the present invention prevents the light reflected off the electroluminescent light from being projected to the outside through the key buttons, thereby preventing its color from being seen through the key buttons when it is inoperative. This makes it possible for a user to operate the key buttons without feeling incongruity, with maintaining their beauty.

What is claimed is:

1. An illuminated button, comprising:

a key button composed of a light transmission material;

an electroluminescent light source, disposed on a bottom side of said key button, for illuminating, while said electroluminescent light source is operative, said key button from its bottom side;

switch contacts for producing a key operation signal when said key button is depressed; and means for attenuating reflected light from said electroluminescent light while it is inoperative, said attenuating means functioning to prevent light reflected by said electroluminescent light source from being projected through said key button when said electroluminescent light source is not operative.

2. The illuminated button as claimed in claim 1, wherein said attenuating means is composed of a material with a light transmission repression property.

3. The illuminated button as claimed in claim 1, wherein said attenuating means is composed of a material with a light scattering property.

4. The illuminated button as claimed in claim 1, wherein said attenuating means comprises color particles mixed into said light transmission material constituting said key button.

5. The illuminated button as claimed in claim 4, wherein a color of said color particles belongs to a same color family as that of light emitted from said electroluminescent light to backlight said key button.

6. The illuminated button as claimed in claim 5, wherein both said color particles and the light that backlights said key button are white.

7. The illuminated button as claimed in claim 1, wherein said means for attenuating comprises a light transmission color print formed on the bottom of said key button.

8. The illuminated button as claimed in claim 7, wherein a color of said light transmission color print belongs to a same color family as that of light emitted from said electroluminescent light to backlight said key button.

9. The illuminated button as claimed in claim 8, wherein both said light transmission color print and said light that backlights said key button are white.

10. The illuminated button as claimed in claim 1, wherein said attenuating means comprises a matte surface formed on top of said key button.

11. The illuminated button as claimed in claim 1, wherein said attenuating means comprises a semi-transparent reflection sheet disposed between said key button and said electroluminescent light.

12. The illuminated button as claimed in claim 11, wherein said semi-transparent sheet is disposed on a surface of said electroluminescent light.

13. The illuminated button as claimed in claim 1, wherein said attenuating means comprises a semi-transparent reflection material printed on a surface of said electroluminescent light.

14. The illuminated button as claimed in claim 1, wherein said attenuating means comprises a light scattering prism sheet disposed between said key button and said electroluminescent light.

15. The illuminated button as claimed in claim 1, wherein said attenuating means comprises a base film constituting said electroluminescent light, and wherein said base film has undergone a light transmission repression processing.

16. The illuminated button as claimed in claim 15, wherein said light transmission repression processing is a matte processing applied to a surface of said base film.

17. The illuminated button as claimed in claim 15, wherein said light transmission repression processing is a processing to form a plurality of microscopic triangular asperities on the surface of said base film.

18. The illuminated button as claimed in claim 15, wherein said base film consists of a semi-transparent sheet.

19. The illuminated button as claimed in claim 1, wherein said key button comprises a letter print formed on its top.

20. An illuminated button pad including a plurality of illuminated buttons, each of the illuminated buttons comprising:

a key button composed of a light transmission material;

an electroluminescent light source, disposed on a bottom side of said key button, for illuminating, while said electroluminescent light source is operative, said key button from its bottom side;

switch contacts for producing a key operation signal when said key button is depressed; and means for attenuating reflected light from said electroluminescent light while it is inoperative, said attenuating means functioning to prevent light reflected by said electroluminescent light source from being projected through said key button when said electroluminescent light source is not operative.

\* \* \* \* \*